United States Patent
Ohodnicki, Jr. et al.

(10) Patent No.: US 11,782,210 B2
(45) Date of Patent: Oct. 10, 2023

(54) SENSING AND/OR PROTECTION LAYERS FOR OPTICAL FIBER-BASED SENSORS USING ATOMIC LAYER DEPOSITION SYNTHESIS ON OPTICAL FIBERS

(71) Applicant: University of Pittsburgh—Of the Commonwealth System of Higher Education, Pittsburgh, PA (US)

(72) Inventors: Paul Richard Ohodnicki, Jr., Allison Park, PA (US); Jung-Kun Lee, Pittsburgh, PA (US); Yulin Liu, Pittsburgh, PA (US); Ruishu Wright, Pittsburgh, PA (US); Fei Lu, Lubbock, TX (US); Jeffrey Wuenschell, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 0 days.

(21) Appl. No.: 17/658,334

(22) Filed: Apr. 7, 2022

(65) Prior Publication Data
US 2022/0326439 A1 Oct. 13, 2022

Related U.S. Application Data

(60) Provisional application No. 63/172,332, filed on Apr. 8, 2021.

(51) Int. Cl.
G02B 6/132 (2006.01)
G02B 6/12 (2006.01)

(52) U.S. Cl.
CPC .... G02B 6/132 (2013.01); *G02B 2006/12035* (2013.01); *G02B 2006/12138* (2013.01)

(58) Field of Classification Search
None
See application file for complete search history.

(56) References Cited

U.S. PATENT DOCUMENTS

2019/0041370 A1* 2/2019 Gao ..................... G01N 33/004

FOREIGN PATENT DOCUMENTS

EP 2138471 A1 * 12/2009 ......... C03C 25/1055

OTHER PUBLICATIONS

M. A. Zaghloul, J. H. Mason, M. Wang et al., "High spatial resolution temperature profile measurements of solid-oxide fuel cells," Applied Energy, 288, 116633 (2021).
A. Yan, S. Huang, S. Li et al., "Distributed optical fiber sensors with ultrafast laser enhanced Rayleigh backscattering profiles for real-time monitoring of solid oxide fuel cell operations," Scientific reports, 7(1), 1-9 (2017).
W. R. Fahrner, R. Job, and M. Werner, "Sensors and smart electronics in harsh environment applications," Microsystem technologies, 7(4), 138-144 (2001).

(Continued)

*Primary Examiner* — Chad H Smith
(74) *Attorney, Agent, or Firm* — Philip E. Levy; Eckert Seamans Cherin & Mellott, LLC (57) ABSTRACT

A method of making an optical fiber-based sensor includes providing an optical fiber, and providing a sensing or protection layer on a surface of the optical fiber by an atomic layer deposition (ALD) process.

9 Claims, 7 Drawing Sheets

(56) References Cited

OTHER PUBLICATIONS

M. Badar, P. Lu, Q. Wang et al., "Real-Time Optical Fiber-Based Distributed Temperature Monitoring of Insulation Oil-mmersed Commercial Distribution Power Transformer," IEEE Sensors Journal, 21(3), 3013-3019 (2020).

H. Chen, M. Buric, P. R. Ohodnicki et al., "Review and perspective: Sapphire optical fiber cladding development for harsh environment sensing," Applied Physics Reviews, 5(1), 011102 (2018).

J. Wuenschell, Y. Jee, D. Lau et al., "Combined plasmonic Au-nanoparticle and conducting metal oxide high-temperature optical sensing with LSTO," Nanoscale, (2020).

K.J. Kim, J. T. Culp, P. R. Ohodnicki et al., "Alkylamine-lntegrated Metal-Organic Framework-Based Waveguide Sensors for Efficient Detection of Carbon Dioxide from Humid Gas Streams," ACS applied materials & interfaces, 11 (36), 33489-33496 (2019).

Y. Jee, Y. Yu, H. W. Abernathy et al., "Plasmonic Conducting Metal Oxide-Based Optical Fiber Sensors for Chemical and Intermediate Temperature-Sensing Applications," ACS applied materials & interfaces, 10(49), 42552-42563 (2018).

P. Ohodnicki Jr, M. Andio, and C. Wang, "Optical gas sensing responses in transparent conducting oxides with large free carrier density," Journal of Applied Physics, 116(2), 024309 (2014).

P. R. Ohodnicki, M. P. Buric, T. D. Brown et al., "Plasmonic nanocomposite thin film enabled fiber optic sensors for simultaneous gas and temperature sensing at extreme temperatures," Nanoscale, 5(19), 9030-9039 (2013).

P. Lu, N. Lalam, M. Badar et al., "Distributed optical fiber sensing: Review and perspective," Applied Physics Reviews, 6(4), 041302 (2019).

J. Wuenschell, Y. Jee, and P. Ohodnicki Jr, "Optical gas sensing properties of gold-nanoparticle incorporated LSTO films at high temperature " 10919, 109191X.

P. R. Ohodnicki Jr, T. D. Brown, G. R. Holcomb et al., "High temperature optical sensing of gas and temperature using Au-nanoparticle incorporated oxides," Sensors and Actuators B: Chemical, 202, 489-499 (2014).

Y.N. Wu, J. K. Wuenschell, R. Fryer et al., "Theoretical and experimental study of temperature effect on electronic and optical properties of $TiO_2$: comparing rutile and anatase," Journal of Physics: Condensed Matter, 32(40), 405705 (2020).

J. Rongé, T. Bosserez, D. Martel et al., "Monolithic cells for solar fuels," Chemical Society Reviews, 43(23), 7963-7981 (2014).

Q. Xie, Y.-L. Jiang, C. Detavernier et al., "Atomic layer deposition of $TiO_2$ from tetrakis-dimethyl-amido titanium or Ti sopropoxide precursors and $H_2O$," Journal of applied physics, 102(8), 083521 (2007).

J. Aarik, A. Aidla, A.-A. Kiisler et al., "Effect of crystal structure on optical properties of $TiO_2$ films grown by atomic ayer deposition," Thin Solid Films, 305(1-2), 270-273 (1997).

P. R. Ohodnicki Jr, C. Wang, S. Natesakhawat et al., "In-situ and ex-situ characterization of $TiO_2$ and Au nanoparticle ncorporated $TiO_2$ thin films for optical gas sensing at extreme temperatures," Journal of Applied Physics, 111(6), 064320 (2012).

P. Moseley, "New trends and future prospects of thick-and thin-film gas sensors," Sensors and Actuators B: Chemical, 3(3), 167-174 (1991).

* cited by examiner

SENSING AND/OR PROTECTION LAYERS FOR OPTICAL FIBER-BASED SENSORS USING ATOMIC LAYER DEPOSITION SYNTHESIS ON OPTICAL FIBERS

CROSS REFERENCE TO RELATED APPLICATIONS

This application claims priority to U.S. Provisional Patent Application Ser. No. 63/172,332, filed Apr. 8, 2021, entitled "Sensing Layers and Protection Layers Using Atomic Layer Deposition Synthesis of Oxides on Silica Optical Fibers", the disclosure of which is incorporated herein by reference.

FIELD OF THE INVENTION

The disclosed relates to optical fiber-based sensors, and, more particularly, to a method of making an optical fiber-based sensor for high temperature and harsh environment sensing by providing a sensing and/or protection layer on a portion of the optical fiber using an atomic layer deposition (ALD) process.

BACKGROUND OF THE INVENTION

Numerous emerging applications can benefit from in-situ monitoring of elevated temperature gas stream chemistry at temperatures greater than approximately 500° C., including solid oxide fuel cells, electrolyzers, reversible solid oxide fuel cell/electrolyzer systems, chemical process reactors, and others. Conventional electrical based sensor instrumentation, however, suffers from instabilities at extreme temperatures, particularly in non-ambient chemical environments, and faces significant challenges in terms of deployment within electrically energized application environments.

Optical fiber-based sensors, on the other hand, show significant advantages for such applications, with commercial silica-based sensors showing promise for applications at temperatures as high as ~800° C. depending upon the ambient chemical environment. Furthermore, extensive prior investigations have demonstrated that the integration of functional sensing layers with an optical fiber-based sensing platform in an evanescent wave absorption spectroscopy configuration can enable optimized responses to one or more analytes of interest through the optical property changes which result from modifications to the ambient environmental conditions.

SUMMARY OF THE INVENTION

These needs, and others, are met by a method of making an optical fiber-based sensor that includes providing an optical fiber, and providing a sensing or protection layer on a surface of the optical fiber by an atomic layer deposition (ALD) process. In the method, the sensing or protection layer includes a nanometer scale thin film. In certain embodiments, the nanometer scale thin film comprises an oxide, such as a refractory oxide that includes at least one of $TiO_2$, $ZrO_2$, or $Al_2O_3$. The nanometer scale thin film may also includes a plurality of nanoparticles, such as plasmonic nanoparticles or core-shell quantum dot nanoparticles.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, the term "number" shall mean one or an integer greater than one (i.e., a plurality).

As used herein, the term "nanoscale" shall mean an object having a size (e.g., diameter or width) ranging from 1 nm to 1 μm (1,000 nm).

As used herein, the term "nanometer scale thin film" shall mean a film material having a thickness of 100 nanometers (nm) or less.

As used herein, the term "nanoparticle" shall mean an object that behaves as a whole unit with respect to its transport and properties and that has a size (e.g., diameter or width) ranging from 1 to 100 nm.

As used herein, the term "core-shell quantum dot" shall mean a nanocrystal material having a quantum dot surrounded by a shell of another type of semiconducting material.

As used herein, the term "quantum dot" shall mean a nanoscale semiconductor particle.

As used herein, the term "plasmonic material" shall mean a material that exhibits an excitation of free carriers which produces an amplification of electromagnetic fields in the near-field of a structure that includes the material.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the disclosed concept. It will be evident, however, that the disclosed concept can be practiced without these specific details without departing from the spirit and scope of this innovation.

As described in detail herein, the disclosed concept employs atomic layer deposition (ALD) for deposition of high quality, nanometer-scale thin films on optical fibers to make optical fiber-based sensors for use in, for example, a high temperature optical fiber-based sensing platform in an evanescent wave absorption spectroscopy configuration. ALD is uniquely suited for the coating of optical fiber-based sensors due to a lack of directionality during the deposition process and compatibility with scalable coating of optical fiber samples. In addition to sensing layers, ALD coated oxides can also serve as protective layers to mitigate against long term degradation at high temperatures in nonambient gas atmospheres. Additional functionality can be provided to ALD coated layers through the addition of functional nanoparticles, etc. for plasmonic and other sensing responses.

More particularly, ALD coated optical fibers provide a uniform, conformal coating structure that enhances the stability of sensing responses and optical fiber transmission as a function of time in challenging environments. The conformal nature of the ALD deposition process is uniquely compatible with optical fiber coating process requirements. In addition, the ability to coat refractory oxides such as $TiO_2$, $ZrO_2$, and $Al_2O_3$, provides opportunities for significant stability enhancement in addition to sensing functionality. The addition of nanoparticles such as plasmonic and core-shell quantum dot nanoparticles also allows for enhanced sensing responses.

As described in greater detail herein, the exemplary embodiment of the disclosed concept employs atomic layer deposited thin films of oxides such as $TiO_2$ in terms of both the temperature in an oxidizing background as well as the gas phase chemistry dependence for varying levels of $H_2$ in a dilute $O_2$ background. The results show an interesting broadband absorption of as-deposited films associated with an initially amorphous structure as well as a reversible and strong $H_2$ sensing response at elevated temperatures. ALD based oxide films thus show significant future potential for applications as sensing layers in high temperature optical fiber-based sensing devices and platforms.

More specifically, in the exemplary embodiment of the disclosed concept, ALD coated $TiO_2$ sensing layers are demonstrated to show a pronounced optical absorption in the visible range which depends upon subsequent processing temperatures and chemical environments. More specifically, the ALD deposition conditions result in the formation of initially amorphous $TiO_2$ layers, which show a broad absorption band across the visible range due to the amorphous structure. A reversible temperature dependent response is observed, and above a critical temperature (~400-500° C.) during manufacturing of the device, crystallization of the $TiO_2$ results in an irreversible change in optical absorption with a sharpened absorption peak associated with the band edge for which the temperature dependence is consistent with prior experiments and theoretical results. Operation of devices based upon changes in optical absorption due to crystallization or other transformations can also be envisioned. Following crystallization of the initially amorphous $TiO_2$ layer, a strong and stable $H_2$ sensing response is also demonstrated for $H_2$ concentrations of various levels ranging from 0-3.9% $H_2$ in nitrogen balance, and at temperatures up to 800° C. Particularly attractive responses are shown in the telecom wavelengths (1550 nm), indicating potential application for distributed sensing with commercially available techniques.

Figure 1:
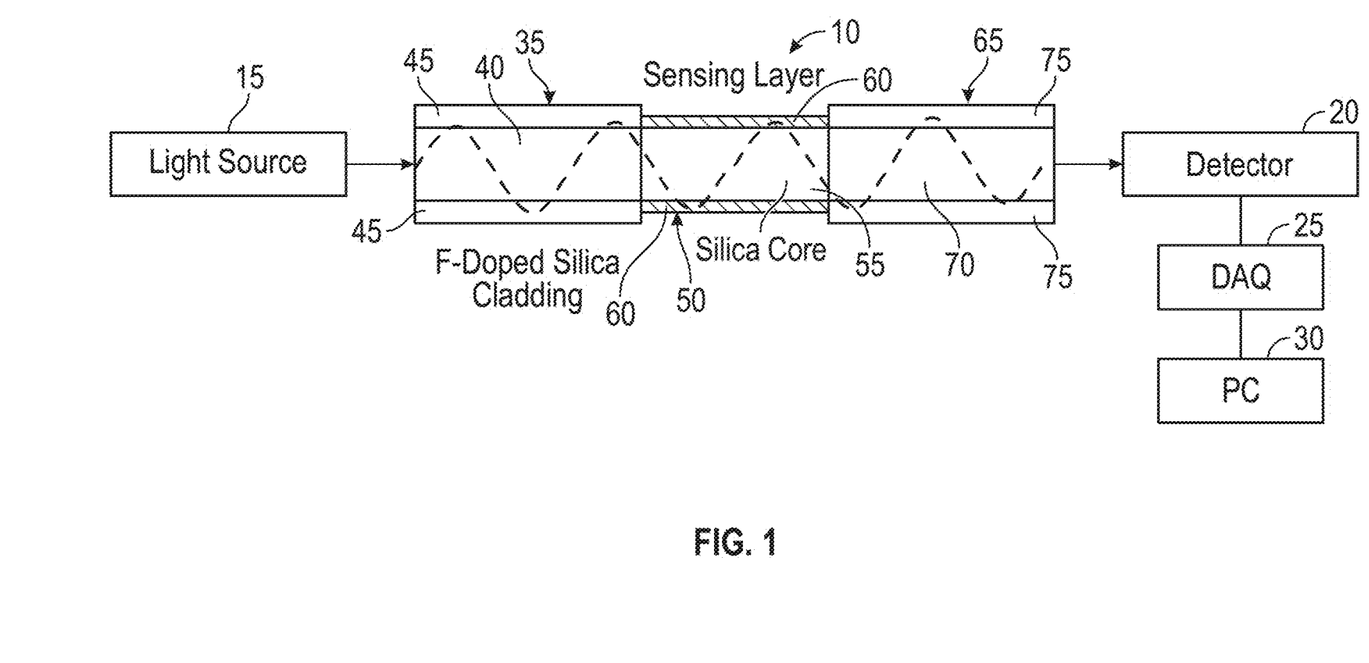
FIG. 1 is a schematic diagram of an in-situ monitoring system that utilizes an optical fiber-based sensor member that is made by providing a sensing and/or protection layer on a portion of the optical fiber using an ALD process according to the disclosed concept.

FIG. 1 is a schematic diagram of an exemplary monitoring system 5 for in-situ monitoring of elevated temperature gas stream chemistry that utilizes an optical fiber-based sensor member 10 that is made by providing a sensing and/or protection layer on a portion of the optical fiber using an ALD process as described herein. As seen in FIG. 1, monitoring system 5 includes a light source 15, such as a halogen lamp or a laser source, that is coupled to an input end of optical fiber-based sensor member 10. Monitoring system 5 further includes a photodetector 20 that is coupled to an output end of optical fiber-based sensor member 10. The output of photodetector 20 is provided to a data acquisition (DAQ) unit 25 and a PC 30 with data processing software, such as LABVIEW™ software.

In the non-limiting exemplary embodiment shown in FIG. 1, optical fiber-based sensor member 10 has the structure that is shown schematically in FIG. 1. In particular, optical fiber-based sensor member 10 includes a first fiber section 35 in the form of a silica core portion 40 surrounded by an F-doped silica cladding portion 45, a second fiber section 50 in the form of a silica core portion 55 surrounded by an ALD deposited sensing layer 60, and a third fiber section 65 in the form of a silica core portion 70 surrounded by an F-doped silica cladding portion 75.

In one particular exemplary embodiment described herein for illustrative purposes, optical fiber-based sensor member 10 may be prepared using 10 cm of "coreless" termination fiber (e.g., For example, Thorlabs FG125LA, 125-μm diameter fiber) as the sensing region (i.e., second fiber section 50). In addition, in this exemplary embodiment, approximately 1.5 m of multimode LCA fiber (e.g., Thorlabs FG105LCA, 105-μm diameter core, 120-μm external diameter with cladding) may be used as the first fiber section 35 and the third fiber section 65. In the exemplary embodiment, the plastic jacket was mechanically stripped from the coreless fiber and each end was spliced to the multimode lead-in an lead out fibers (i.e., the first fiber section 35 and the third fiber section 65).

Figure 2:
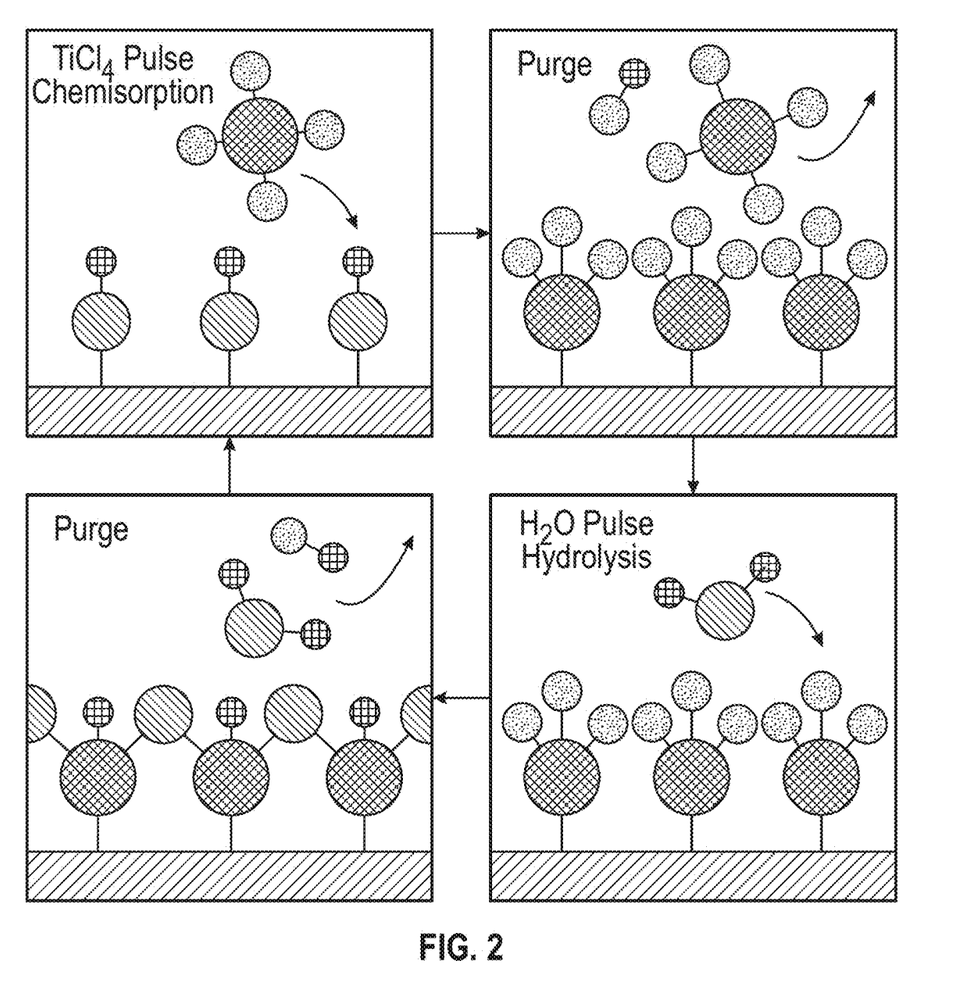
FIG. 2 is schematic diagram illustrating an ALD process that may be employed in connection with the disclosed concept.
Figure 3:
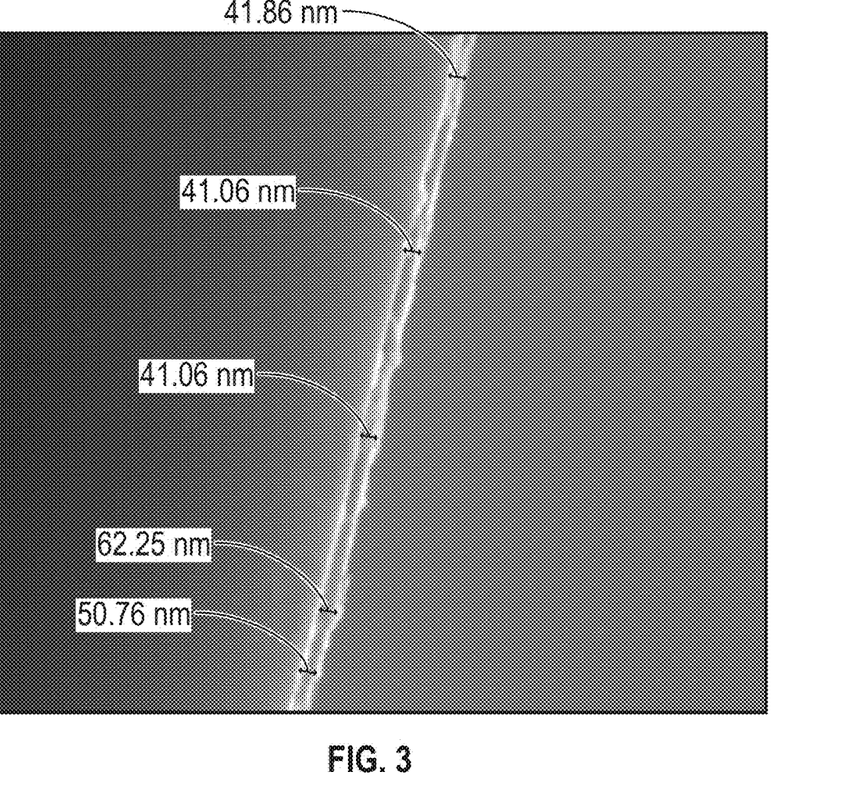
FIG. 3 is a scanning electron microscopy image acquired in cross-section for an approximately 50 nm thick ALD deposited $TiO_2$ film according to an embodiment of the disclosed concept.

A method of making optical fiber-based sensor member 10 according to one non-limiting exemplary embodiment of the disclosed concept will now be described in connection with FIG. 2 in which ALD is used to deposit a nanometer scale thin film of $TiO_2$ on silica core portion 55. In this exemplary embodiment, the film may be deposited at varying thicknesses, such as, without limitation, 10 nm or 50 nm. As demonstrated in FIG. 2, taken from J. Rongé, T. Bosserez, D. Martel et al., "Monolithic cells for solar fuels," Chemical Society Reviews, 43(23), 7963-7981 (2014), ALD is a layer-by-layer thin film deposition method process in which the precursor and reactant are pulsed alternatively to react and deposit one atomic layer on the substrate at a time. The residual materials and by-product are purged with inert gas between every pulse. Thus, by selecting the categories of the precursor and oxygen reactant and controlling ALD process parameters, the properties such as thickness and morphology of materials can be precisely controlled. FIG. 2 shows a representative cycle of $TiO_2$ deposition using $TiCl_4$ and $H_2O$. An example scanning electron microscopy image acquired in cross-section for an approximately 50 nm thick ALD deposited $TiO_2$ film is presented in FIG. 3.

In one particular embodiment used in testing the disclosed concept, a compact $TiO_2$ layer was deposited on the optical fiber at 120° C. using a commercial atomic layer deposition (ALD) system (e.g., sold by Cambridge Nanotech Inc.). Tetrakis(dimethylamido)titanium (TDMAT) and pure DI water were the Ti source and oxidant, respectively. The substrate was held in a chamber with a base pressure of ~0.1 Torr during sample heating. Once temperature increased to 120° C., in-line nitrogen gas was flowed into the chamber as a carrier gas at the rate of 20 SCCM and a process pressure of the chamber increased to 0.3 Torr. Then, TDMAT and water were sequentially injected to the chamber. A pulse time of TDMAT and water were 0.15 s and 0.015 s. Between two pulses, the chamber was purged for 15 seconds. During deposition, temperature of the precursor (TDMAT) and water was maintained at 75° C. and ambient.

The reaction of high-purity TDMAT with DI water oxidant per one cycle is shown below, and the deposition rate was around 0.1 nm/cycle.

Figure 4:
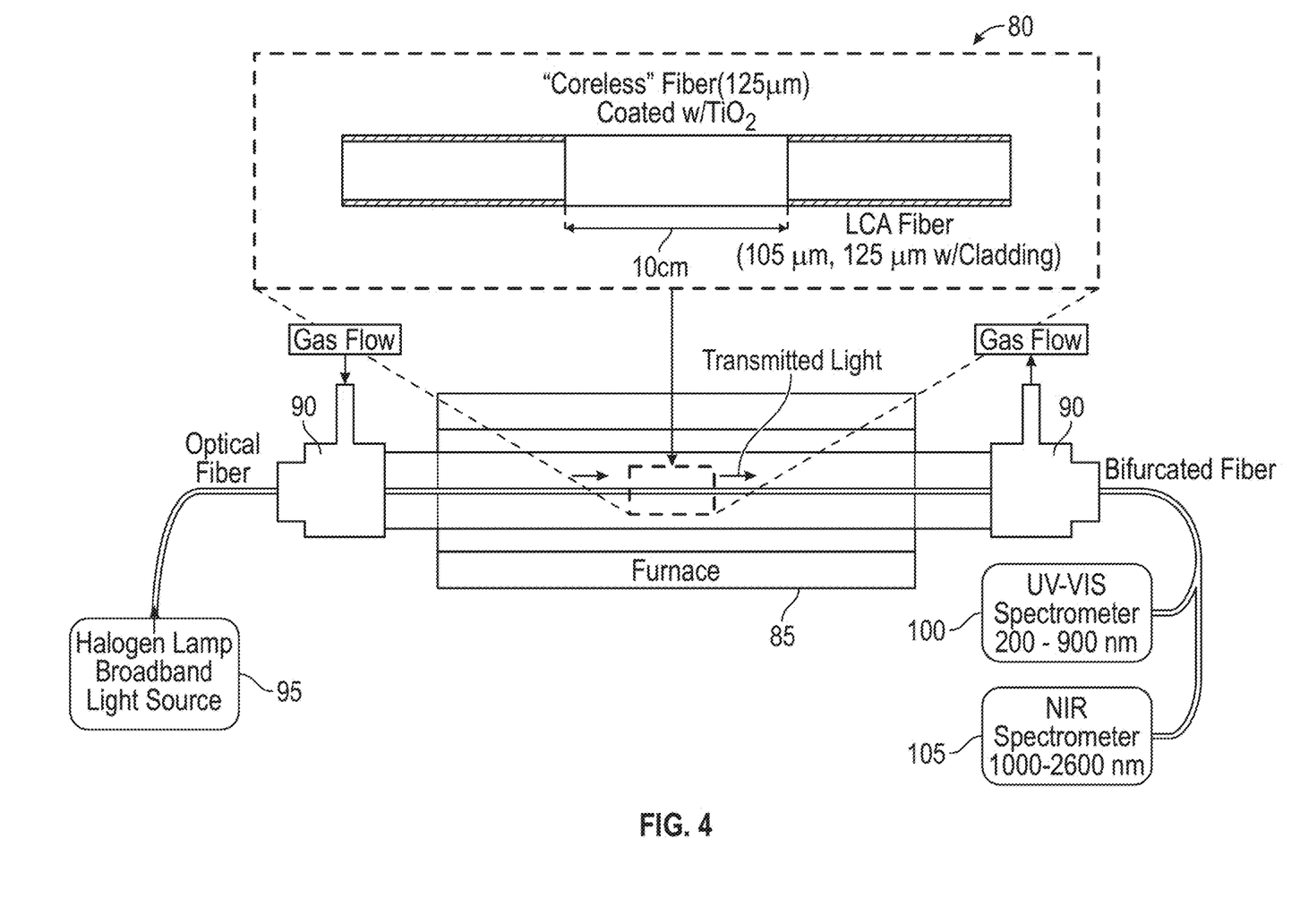
FIG. 4 is a schematic diagram of an experimental setup used to measure the optical transmission properties of an exemplary optical fiber-based sensor member made according to the disclosed concept.

Furthermore, the optical transmission properties of the exemplary optical fiber-based sensor member 10 so formed were measured in an experimental setup 80 as shown in FIG. 4 using a tube furnace 85 with custom-designed end caps 90 to allow for both controlled gas flow and feed through of optical fiber-based sensor member 10. Broadband illumination of the optical fiber was achieved with a halogen light source 95 (e.g., Ocean Optics DH-BAL). The fiber was cleaved and coupled to a commercial bifurcated fiber, to allow for UV-VIS and NIR light collection. The UV-Vis spectrum was collected with an Ocean Optics Flame spectrometer (178-870 nm) and the NIR spectrum was collected with an ArcOptix Rocket FT-NIR spectrometer 105 (900-2500 nm).

In each experiment, an initial bright and dark baseline measurement was acquired, which define 100% and 0% transmission. The dark baseline for each run is defined as the collected intensity at room temperature with the halogen light source shutter closed. The bright baseline is taken at the beginning of a series to provide a point of comparison. This avoids the necessity of considering absolute transmitted intensity, which may have features associated with the lamp spectrum or may be impacted by the repeatability of coupling light into and out of the fiber. Low signal-to-noise was observed in several regions: (1) in the near-UV, where the intensity of the halogen source is weak, (2) at the edge of the wavelength range of the two detectors (around 900 nm), and (3) near 1400 nm, where the fiber splitter utilized exhibits a strong hydroxyl band absorption peak. These regions are omitted from the spectra presented here, as they are dominated by noise and contain no useful information.

Moreover, gas flow was achieved with an array of mass flow controllers, controlled by a custom-built LabView interface. All experiments reported here were performed at a total flow rate of 100 sccm at ambient pressure. Tests were performed using mixtures of ultra-high purity nitrogen (Matheson Nitrogen, Ultra High Purity 99.999%), oxygen, and 3.9% hydrogen in nitrogen balance. Tests were performed in 1-hour cycles to allow sufficient time for the reactor gas environment to sufficiently reach equilibrium. In each time series, visible and NIR spectra were captured at 30-s intervals.

Figure 5A:
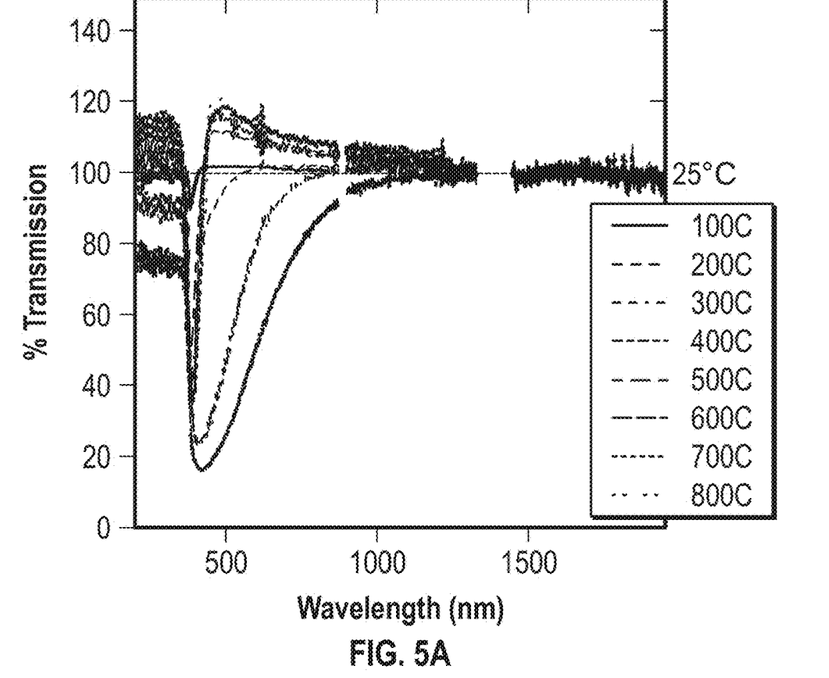
FIG. 5A shows the optical transmission through an exemplary fiber coated with 10-nm $TiO_2$ according to an exemplary embodiment of the disclosed concept.
Figure 5B:
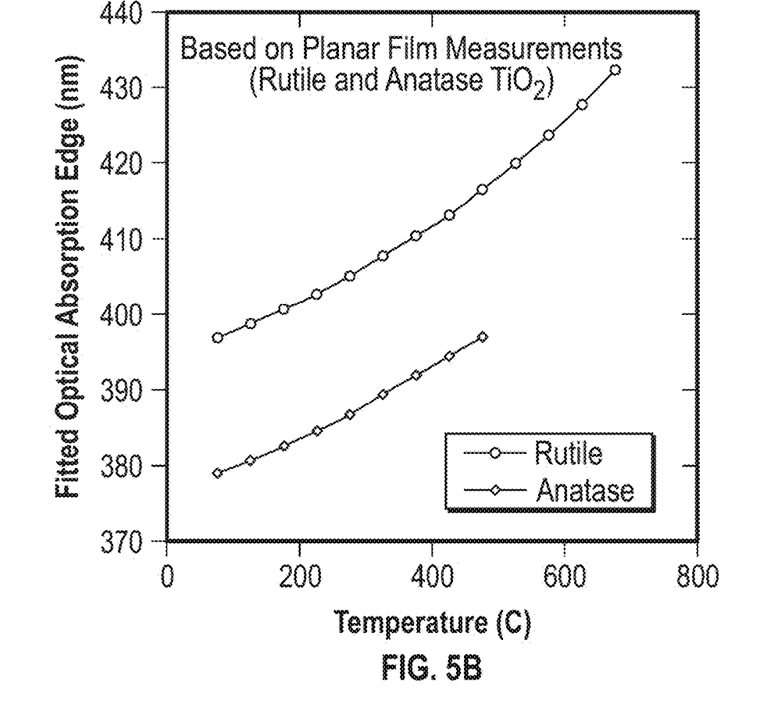
FIG. 5B shows the approximate absorption edge of rutile and anatase phases of $TiO_2$ according to an aspect of the disclosed concept.

The temperature dependent optical properties of the as-deposited, 10-nm film on fiber were determined by first mounting the sample as depicted in FIG. 1. Initial bright and dark baseline measurements of the transmission spectrum were acquired at room temperature in both the visible and NIR. The transmission spectrum was then acquired in 100° C. increments from 100-800° C. and at each temperature step, the system was stabilized for 5 minutes prior to the acquisition of a transmission spectrum. These spectra are presented in FIG. 5A, all relative to the initial transmission spectrum at 25° C. From room temperature to 400° C., the transmission spectrum was dominated by a broad absorption feature at short wavelength that gradually grows with increasing temperature. Prior work (both experimental and computational) has established that the optical absorption edge of both rutile and anatase $TiO_2$ red shifts with increasing temperature (demonstrated in FIG. 5B), from data presented in Y.-N. Wu, J. K. Wuenschell, R. Fryer et al., "Theoretical and experimental study of temperature effect on electronic and optical properties of TiO2: comparing rutile and anatase," Journal of Physics: Condensed Matter, 32(40), 405705 (2020). In the current case, the absorption edge, which is clearly apparent below 400° C., is extremely broad and is consistent with a disordered, amorphous as-deposited film, which is quite common for ALD deposited oxides such as $TiO_2$ grown at low temperature (<165° C.). At 500° C., a sharp narrowing of the absorption band occurs due to crystallization of the initially amorphous phase and above this temperature, the narrowed absorption edge continues to red shift which is consistent with expectations for crystalline $TiO_2$ based upon prior work. It is useful to note that prior work (P. R. Ohodnicki Jr, C. Wang, S. Natesakhawat et al., "In-situ and ex-situ characterization of TiO2 and Au nanoparticle incorporated TiO2 thin films for optical gas sensing at extreme temperatures," Journal of Applied Physics, 111(6), 064320 (2012)) has reported preferential formation of anatase at relatively low annealing temperatures with a transformation to rutile phase at higher temperatures, and with a critical temperature depending upon ambient gas phase environment with reducing and $H_2$ containing atmospheres tending to promote formation of rutile phase.

Figure 6A:
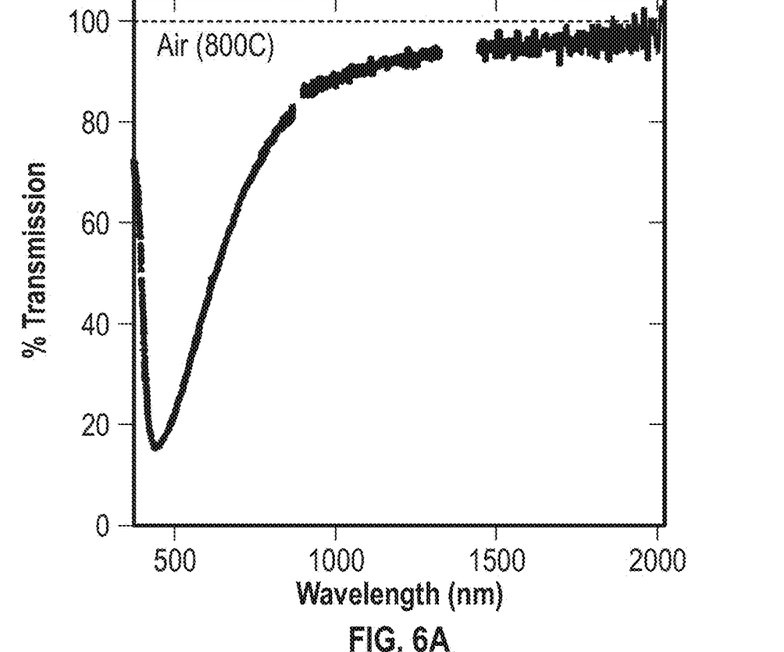
FIG. 6A shows the change in transmission of an exemplary fiber after exposure to hydrogen.
Figure 6B:
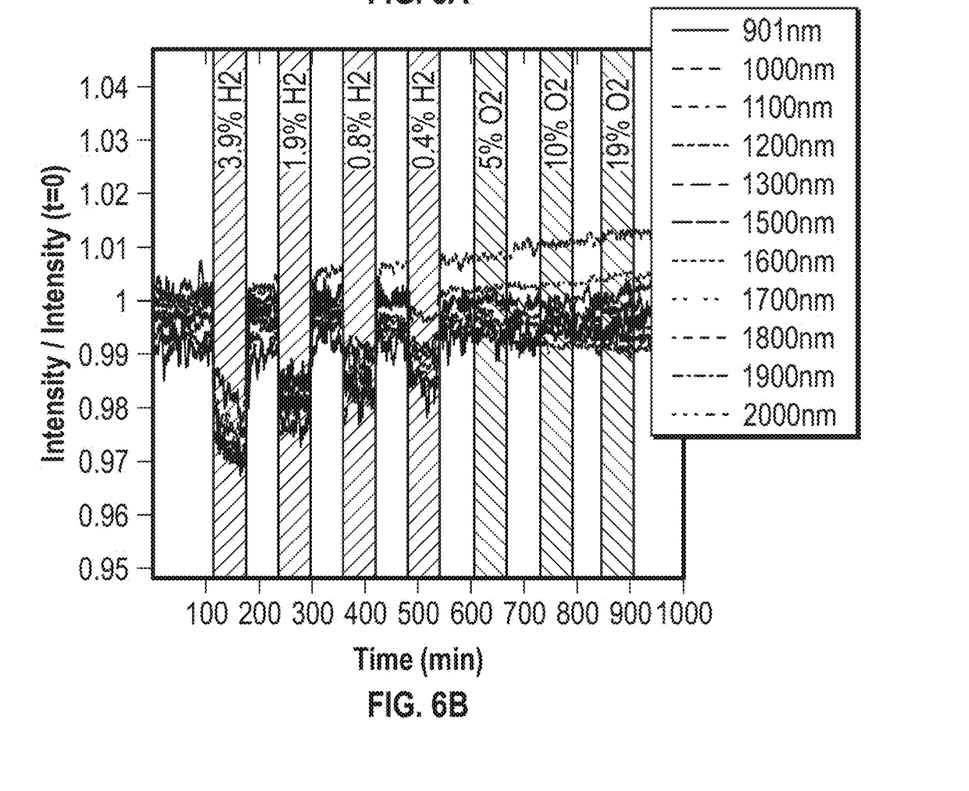
FIG. 6B shows the change in transmission in NIR relative to baseline for an exemplary fiber after cycling between varying concentrations of hydrogen and oxygen at 800° C.
Figure 7A:
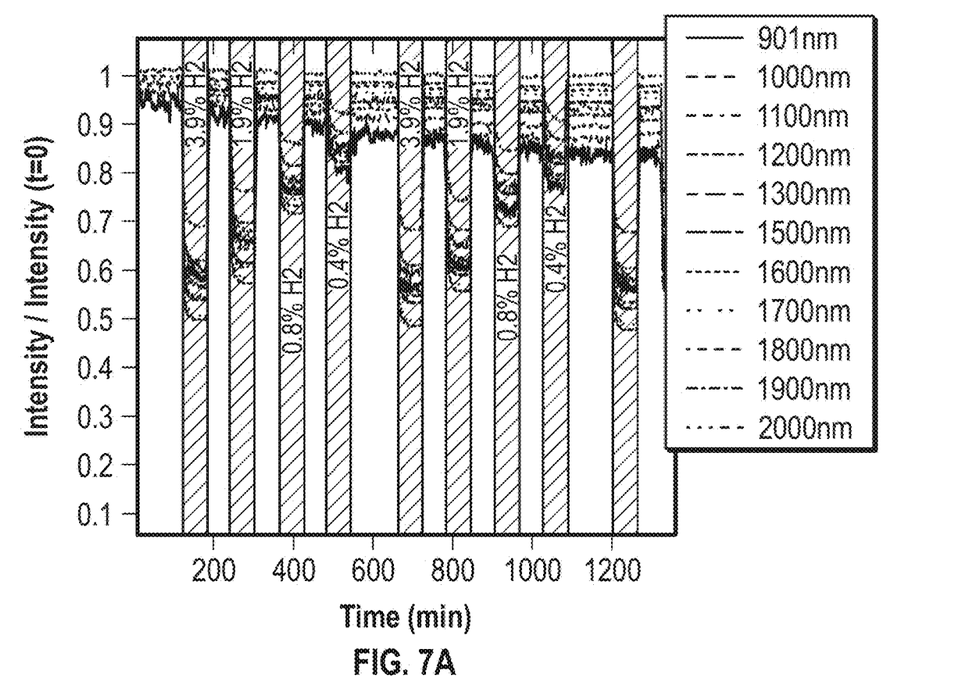
FIG. 7A shows the response of an exemplary fiber to varying levels of hydrogen.
Figure 7B:
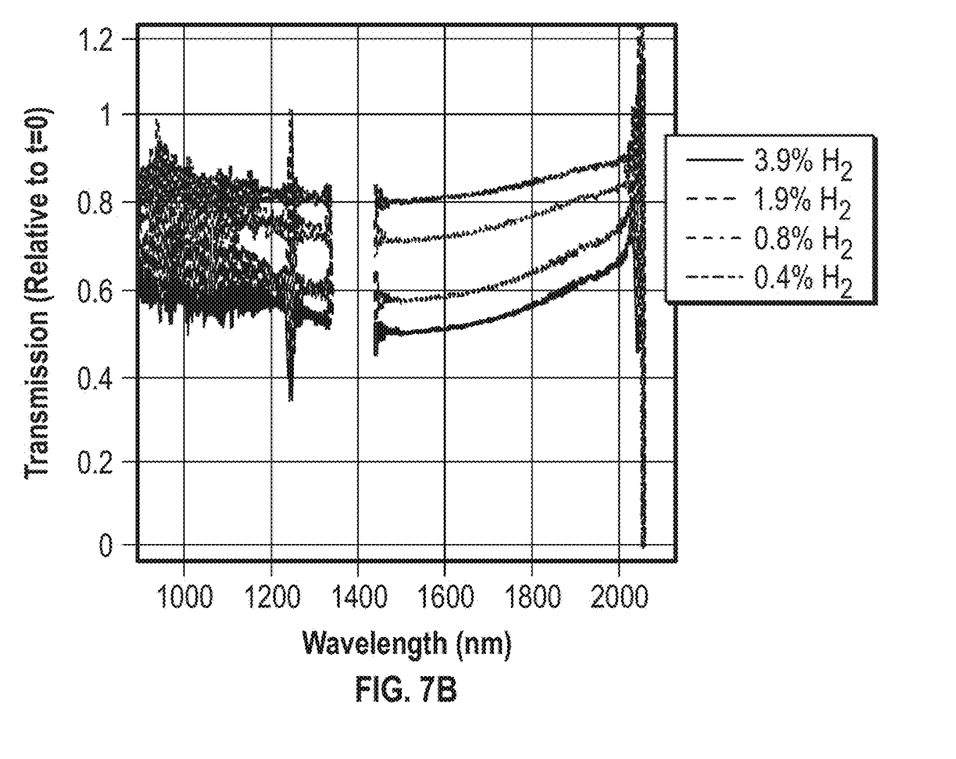
FIG. 7B shows the relative change in NIR transmission for the exemplary fiber shown in FIG. 7A.

After performing the temperature series outlined above, the exemplary optical fiber-based sensor member 10 was held at 800° C. in air and allowed to stabilize for 1 hour and a new 100% baseline was taken. The fiber was then exposed to 3.9% $H_2$ for 1 hour at 800° C. and the relative change in transmission was measured, as shown in FIG. 6A. The impact of hydrogen exposure is most significant in the visible range, consistent with a broad absorption tail below the optical absorption edge that is enhanced by exposure to the reducing gas atmosphere. It is interesting to note that a traditional Burstein-Moss effect is expected to result in a shift of the band-edge to shorter wavelengths as reported in P. Lu, N. Lalam, M. Badar et al., "Distributed optical fiber sensing: Review and perspective," Applied Physics Reviews, 6(4), 041302 (2019), yet the actual observations discussed herein suggest either a shift of the band-edge to longer wavelengths or, more likely, an irreversible modification to the underlying film microstructure and defect structure resulting in enhanced relative absorption in the visible and short-wavelength near-infrared range. After the first hour of exposure, the 10-nm thick coated exemplary optical fiber-based sensor member 10 was then cycled between 1% $O_2$ and varying levels of hydrogen, as shown in light blue in FIG. 6B, in 1-hr steps. The super-cycle shown in FIG. 6B was repeated three times to ensure that a reversible response could be attained. For the final hydrogen cycle, the relative change of intensity is shown for a range of different wavelengths in the NIR, as shown in FIG. 6B. Going from 3.9% to 0.4% hydrogen, a small but measurable broad NIR response was observed relative to the baseline ranging from 1-2%. After this cycle, the exemplary optical fiber-based sensor member 10 was then exposed to varying levels of oxygen (up to 20%), showing no significant response to oxygen. This is consistent with expectations for an n-type conducting oxide, such as $TiO_2$, which tends to respond much more strongly to reducing conditions than oxidizing conditions. The same series of tests was also repeated with a nominally identically prepared exemplary optical fiber-based sensor member 10 coated with 50 nm of $TiO_2$. The final two cycles of exposure for varying levels of hydrogen are shown in FIG. 7A, which demonstrates a much stronger response as compared to the thinner film sensor. More specifically, at 1500 nm a peak response of 20-50% is observed going from 0.4-3.9% hydrogen (relative to 1% oxygen reference), which is an order of magnitude larger than for the corresponding 10 nm thick film. The overall NIR spectra at the end of each hydrogen cycle is shown in FIG. 7A (with transmission at t=0 used as the baseline reference), and the transmission spectrum presented exhibits a broad NIR absorption feature, again roughly peaked at 1500 nm. Broad NIR absorption features are characteristic of Drude-based absorption observed in conducting metal oxide type sensors.

Thus, the disclosed concept provides a unique characteristic broadband absorption for as-deposited ALD produced $TiO_2$ films associated with an amorphous structure that displays a qualitatively similar temperature dependence as compared to prior reports for crystalline $TiO_2$ films in terms of an increase in absorption at longer wavelengths with increasing temperature. In addition, the experimentation that has been performed demonstrates clear evidence for the crystallization of the amorphous $TiO_2$ through sharpening of the band-edge absorption peak above a temperature of approximately 400° C. Following controlled cycling experiments to stabilize the film microstructure and response, reversible and monotonic responses to $H_2$ were also observed in the near-infrared range for ALD deposited films of both 10 nm and 50 nm thickness. These responses are consistent with a traditional Drude-type free electron-based response of conducting metal oxides which has been reported in prior work and show significant promise for sensing applications in high temperature application environments.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A method of making an optical fiber-based sensor, comprising:
    providing an optical fiber;
    providing a sensing or protection layer on a surface of the optical fiber by an atomic layer deposition (ALD) process, the sensing or protection layer including a nanometer scale thin film, wherein the nanometer scale thin film comprises an oxide; and
    causing crystallization of the oxide to provide an irreversible change in optical absorption of the sensing or protection layer by raising a temperature of the sensing or protection layer above a critical temperature of 400° C.-500° C.

2. The method according to claim 1, wherein the oxide comprises $TiO_2$.

3. The method according to claim 1, wherein the oxide comprises a refractory oxide.

4. The method according to claim 3, wherein the refractory oxide comprises at least one of $TiO_2$, $ZrO_2$, or $Al_2O_3$.

5. The method according to claim 1, further comprising providing a plurality of nanoparticles in the sensing or protection layer.

6. The method according to claim 5, wherein the nanoparticles include nanoparticles made of a plasmonic material.

7. The method according to claim 5, wherein the nanoparticles include a plurality of quantum dots.

8. The method according to claim 7, wherein the quantum dots include core-shell quantum dots.

9. The method according to claim 1, wherein the critical temperature is 400° C.

* * * * *